:::

United States Patent
Tanaka et al.

(10) Patent No.: US 11,804,220 B2
(45) Date of Patent: Oct. 31, 2023

(54) VOICE PROCESSING DEVICE, VOICE PROCESSING METHOD AND VOICE PROCESSING SYSTEM

(71) Applicant: PANASONIC INTELLECTUAL PROPERTY MANAGEMENT CO., LTD., Osaka (JP)

(72) Inventors: Naoya Tanaka, Fukuoka (JP); Tomofumi Yamanashi, Kanagawa (JP); Masanari Miyamoto, Fukuoka (JP)

(73) Assignees: PANASONIC INTELLECTUAL PROPERTY MANAGEMENT CO., LTD., Osaka (JP); PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 542 days.

(21) Appl. No.: 16/979,714

(22) PCT Filed: Dec. 11, 2018

(86) PCT No.: PCT/JP2018/045419
§ 371 (c)(1),
(2) Date: Sep. 10, 2020

(87) PCT Pub. No.: WO2019/187371
PCT Pub. Date: Oct. 3, 2019

(65) Prior Publication Data
US 2021/0043198 A1 Feb. 11, 2021

(30) Foreign Application Priority Data
Mar. 29, 2018 (JP) .................................. 2018-066232

(51) Int. Cl.
*G10L 15/20* (2006.01)
*B60R 11/02* (2006.01)
(Continued)

(52) U.S. Cl.
CPC .......... *G10L 15/20* (2013.01); *B60R 11/0217* (2013.01); *B60R 11/0247* (2013.01);
(Continued)

(58) Field of Classification Search
CPC ......... G10L 15/20; G10L 15/10; G10L 15/30; G10L 2015/088; G10L 21/0208;
(Continued)

(56) References Cited

U.S. PATENT DOCUMENTS 7,043,030 B1 * 5/2006 Furuta .................. G10L 21/0208
704/226
7,552,050 B2 * 6/2009 Matsumoto ............. G10L 15/20
379/406.01

(Continued)

FOREIGN PATENT DOCUMENTS

EP  1562180  8/2005
JP  61-013900  1/1986
(Continued)

OTHER PUBLICATIONS

Extended European Search Report from European Patent Office (EPO) in European Patent Appl. No. 18913012.3, dated Mar. 22, 2021.
(Continued)

*Primary Examiner* — Thuykhanh Le
(74) *Attorney, Agent, or Firm* — Greenblum & Bernstein, P.L.C.

(57) ABSTRACT

This voice processing device is provided with: an utterer's position detection unit which specifies, as position microphones of an utterer, microphones that receive a voice signal of WuW on the basis of the characteristics of each voice signal for a prescribed time, when the WuW voice is detected, the voice signal being held in a voice signal buffer unit; and a CTC unit (one example of a voice processing
(Continued)

unit) which outputs a voice uttered by the utterer and suppress a voice uttered by an occupant, who is not the utterer, by using the voice signal for the prescribed time, which is held in the voice signal buffer unit, and information relating to the utterer's position microphones.

9 Claims, 12 Drawing Sheets

(51) Int. Cl.
  *G10L 15/10* (2006.01)
  *G10L 15/30* (2013.01)
  *H04R 1/02* (2006.01)
  *B60R 11/00* (2006.01)
(52) U.S. Cl.
  CPC .............. *G10L 15/10* (2013.01); *G10L 15/30* (2013.01); *H04R 1/025* (2013.01); *B60R 2011/0005* (2013.01); *B60R 2011/0021* (2013.01)
(58) Field of Classification Search
  CPC ............. B60R 11/0217; B60R 11/0247; B60R 2011/0005; B60R 2011/0021; B60R 11/02; H04R 1/025; H04R 1/40; H04R 3/00; G06F 3/165; G06F 3/167
  USPC ......................................................... 704/231
  See application file for complete search history.

(56) References Cited

U.S. PATENT DOCUMENTS

| | | | | |
|---|---|---|---|---|
| 9,997,173 | B2* | 6/2018 | Dusan | G10L 21/0388 |
| 10,013,057 | B1* | 7/2018 | Li | G06F 3/013 |
| 10,297,245 | B1* | 5/2019 | Chen | G10K 11/17853 |
| 10,657,981 | B1* | 5/2020 | Mansour | H04R 3/005 |
| 10,805,740 | B1* | 10/2020 | Snyder | H04R 25/407 |
| 10,923,119 | B2* | 2/2021 | Chang | G06F 5/085 |
| 11,158,316 | B2* | 10/2021 | Arikita | G10L 15/22 |
| 11,600,269 | B2* | 3/2023 | Pfeffinger | |
| 2004/0057586 | A1* | 3/2004 | Licht | H04R 3/00 381/94.1 |
| 2005/0216271 | A1 | 9/2005 | Konig | |
| 2007/0038444 | A1* | 2/2007 | Buck | B60R 16/0373 704/235 |
| 2009/0055180 | A1* | 2/2009 | Coon | B60R 16/0373 704/251 |
| 2013/0325484 | A1* | 12/2013 | Chakladar | G10L 15/26 704/275 |
| 2014/0188476 | A1* | 7/2014 | Li | G10L 15/222 704/254 |
| 2015/0006167 | A1* | 1/2015 | Kato | G01C 21/3629 704/231 |
| 2015/0046157 | A1* | 2/2015 | Wolff | G10L 25/51 704/231 |
| 2015/0088514 | A1* | 3/2015 | Typrin | G10L 17/00 704/231 |
| 2015/0245129 | A1* | 8/2015 | Dusan | G10L 21/0208 381/71.6 |
| 2016/0196818 | A1* | 7/2016 | Christoph | H04S 7/301 381/71.6 |
| 2016/0225386 | A1* | 8/2016 | Tsujikawa | H04R 1/326 |
| 2017/0013386 | A1* | 1/2017 | Vautin | H04S 3/008 |
| 2017/0075924 | A1* | 3/2017 | Rogers | H04W 4/18 |
| 2017/0110123 | A1 | 4/2017 | Sharifi et al. | |
| 2017/0110130 | A1 | 4/2017 | Sharifi et al. | |
| 2017/0110144 | A1 | 4/2017 | Sharifi et al. | |
| 2018/0122373 | A1* | 5/2018 | Garner | G10L 15/22 |
| 2018/0132037 | A1* | 5/2018 | McGibney | H04S 7/305 |
| 2018/0158461 | A1 | 6/2018 | Wolff et al. | |
| 2018/0190282 | A1* | 7/2018 | Mohammad | G10K 11/178 |
| 2018/0249246 | A1* | 8/2018 | Kjems | H04R 3/005 |
| 2018/0254045 | A1 | 9/2018 | Sharifi et al. | |
| 2018/0268808 | A1* | 9/2018 | Song | G10L 15/22 |
| 2018/0308490 | A1* | 10/2018 | Lim | G10L 15/18 |
| 2018/0354461 | A1* | 12/2018 | Yae | G10L 15/22 |
| 2019/0058944 | A1* | 2/2019 | Gunawan | H04R 3/005 |
| 2019/0073999 | A1* | 3/2019 | Prémont | G10L 15/08 |
| 2019/0080693 | A1* | 3/2019 | Barth | G10L 15/22 |
| 2019/0115018 | A1* | 4/2019 | Zurek | H04R 3/005 |
| 2019/0124462 | A1* | 4/2019 | Lindahl | H04S 7/301 |
| 2019/0129499 | A1* | 5/2019 | Li | G06Q 30/0241 |
| 2019/0187252 | A1* | 6/2019 | Xu | G06F 3/167 |
| 2019/0237067 | A1* | 8/2019 | Friedman | H04R 1/406 |
| 2019/0259381 | A1* | 8/2019 | Ebenezer | H04R 3/005 |
| 2019/0287536 | A1 | 9/2019 | Sharifi et al. | |
| 2019/0311715 | A1* | 10/2019 | Pfeffinger | G10L 17/22 |
| 2019/0387314 | A1* | 12/2019 | Chavan | G10K 11/17873 |
| 2020/0007690 | A1* | 1/2020 | Miyamoto | H04M 9/085 |
| 2020/0294521 | A1* | 9/2020 | Chen | H04R 1/406 |
| 2020/0312317 | A1* | 10/2020 | Kothari | H04L 43/10 |
| 2020/0364026 | A1* | 11/2020 | Lee | G10L 25/51 |
| 2021/0006900 | A1* | 1/2021 | Ohashi | G10K 11/17854 |
| 2021/0053516 | A1* | 2/2021 | Andersson | G06F 3/167 |
| 2022/0277744 | A1* | 9/2022 | Mohammad | G10L 15/22 |
| 2022/0293103 | A1* | 9/2022 | Zhou | F02D 41/021 |

FOREIGN PATENT DOCUMENTS

| | | |
|---|---|---|
| JP | 11-052976 | 2/1999 |
| JP | 11-065586 | 3/1999 |
| JP | 2001-051694 | 2/2001 |
| JP | 2005-055667 | 3/2005 |
| JP | 2015-513704 | 5/2015 |
| JP | 2017-076117 | 4/2017 |
| WO | 2017/138934 | 8/2017 |

OTHER PUBLICATIONS

International Search Report (ISR) from International Searching Authority (Japan Patent Office) in International Pat. Appl. No. PCT/JP2018/045419, dated Feb. 26, 2019, along with an English language translation.

* cited by examiner

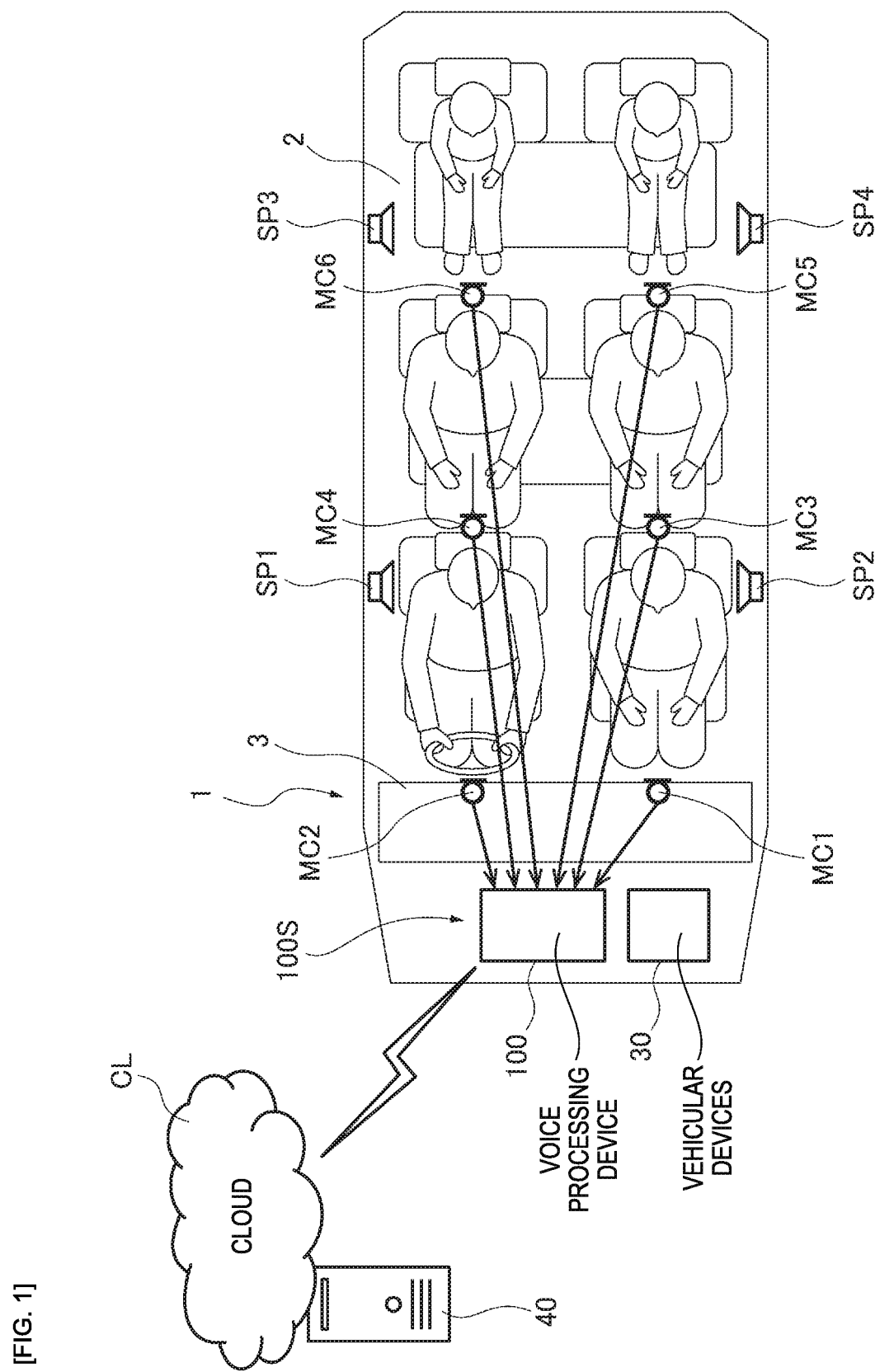
[FIG. 1]

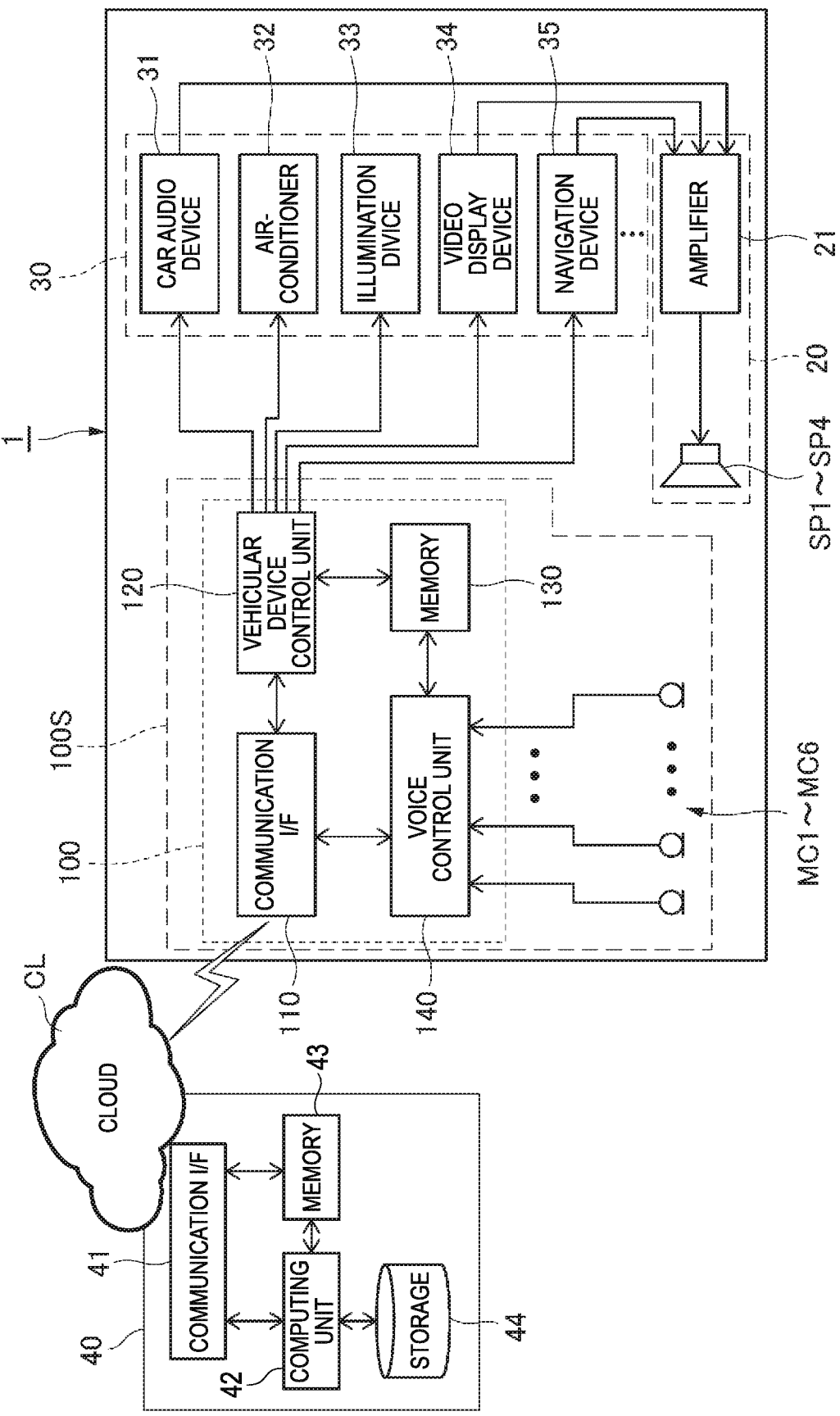
[FIG. 2]

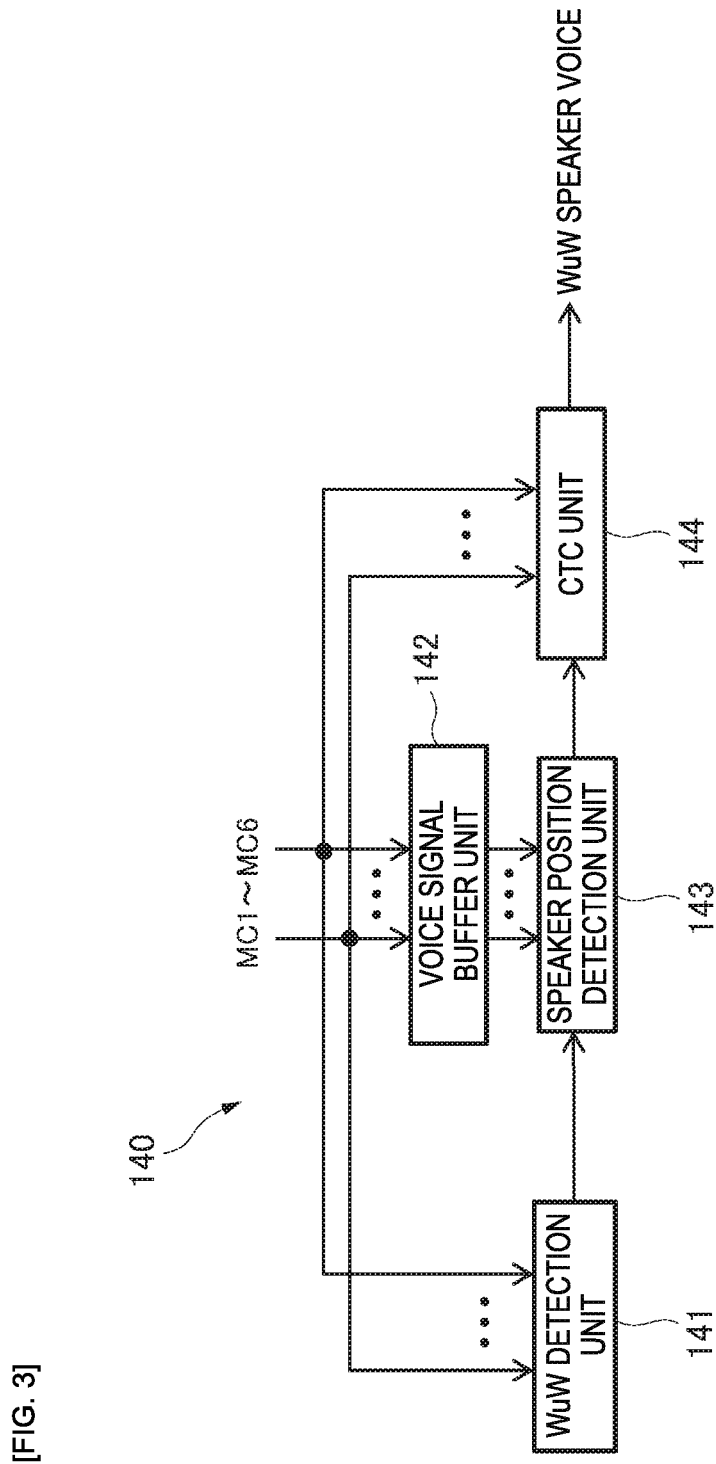

[FIG. 4]
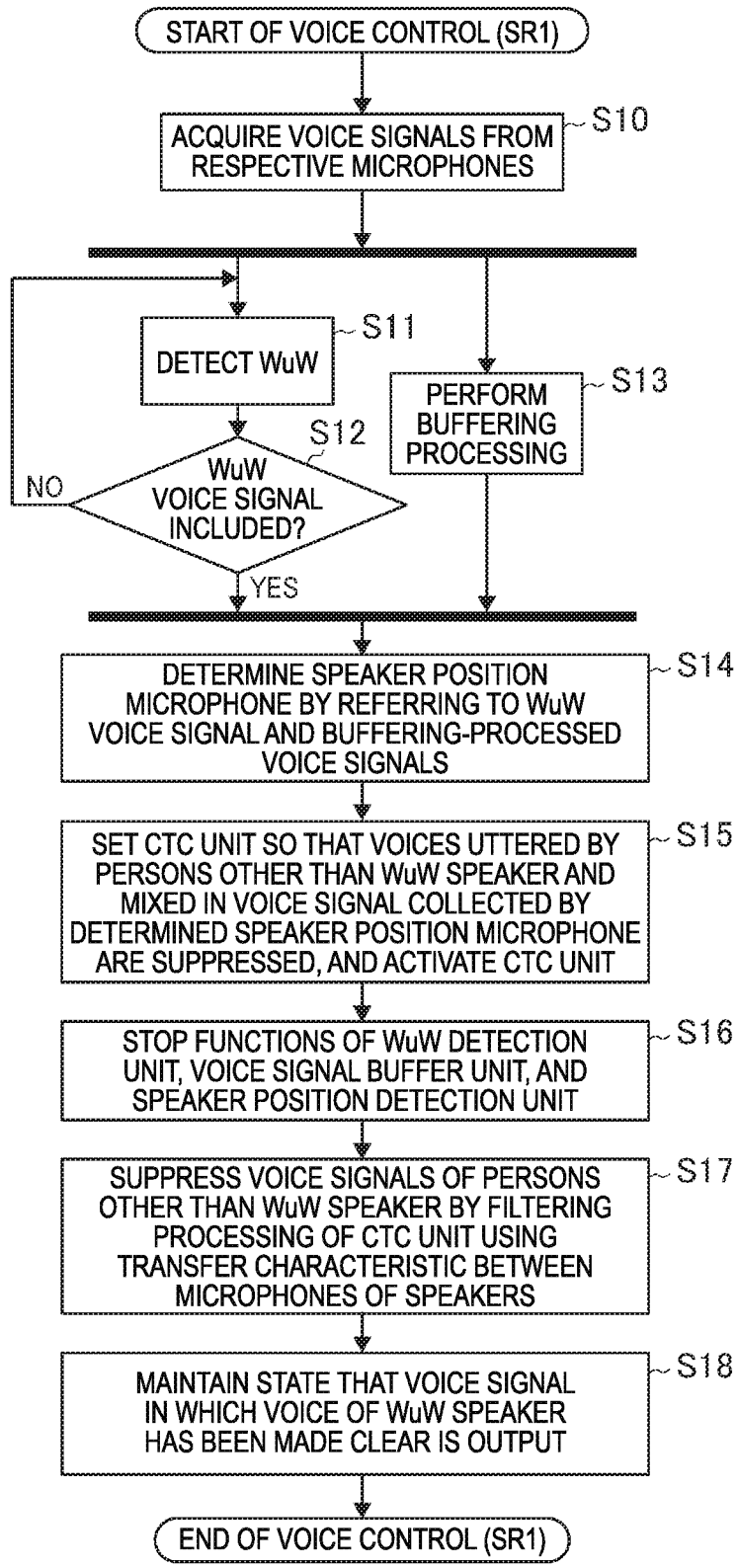

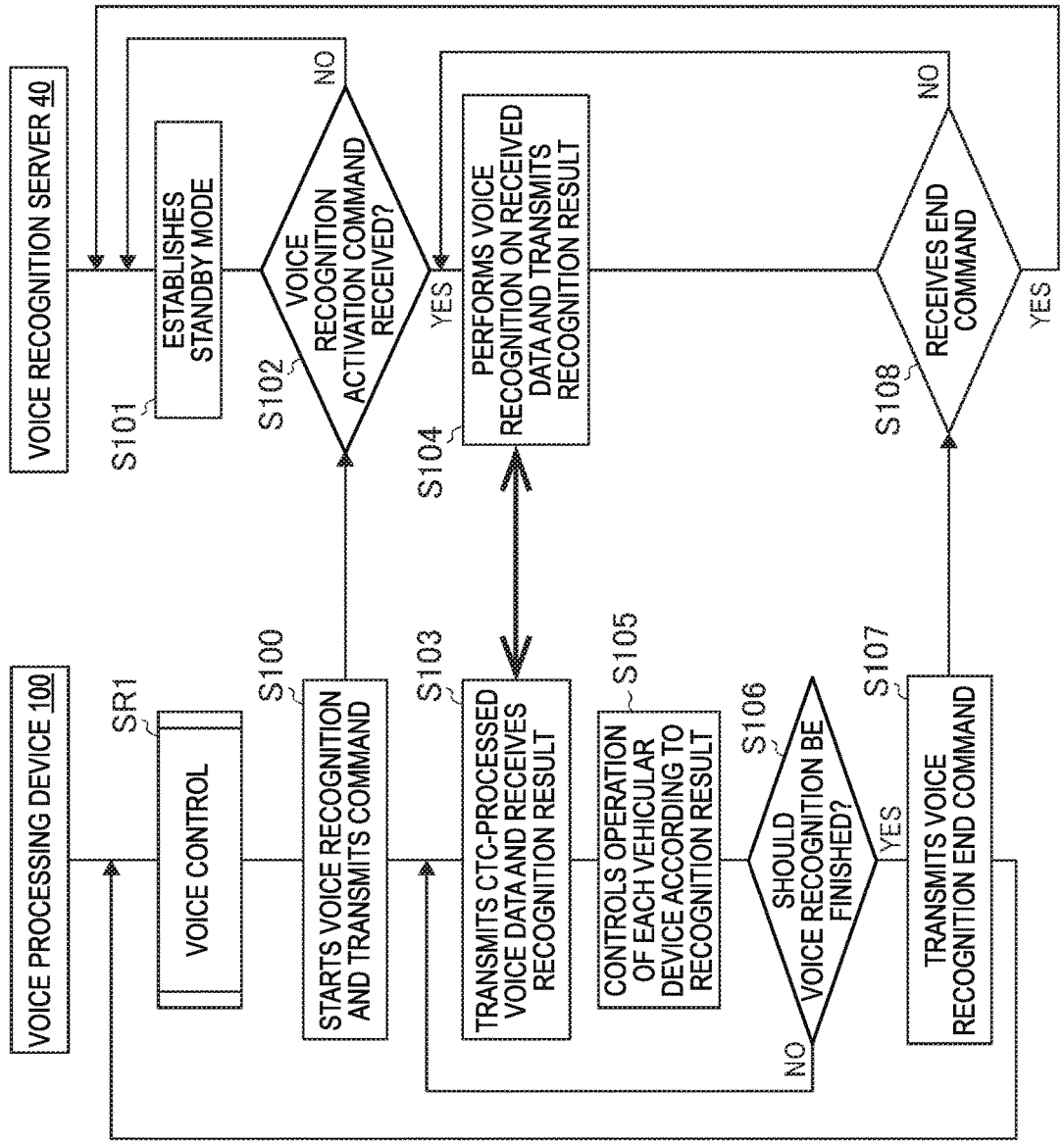
[FIG. 5]

[FIG. 6]
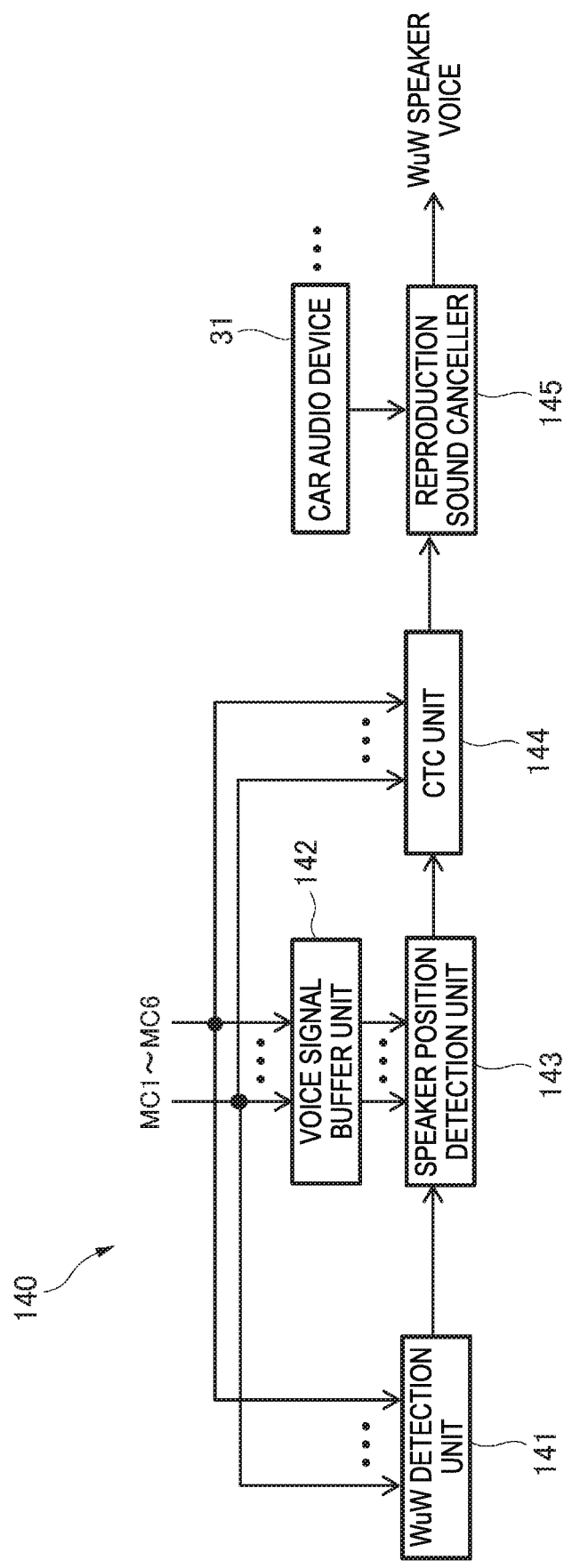

[FIG. 7]
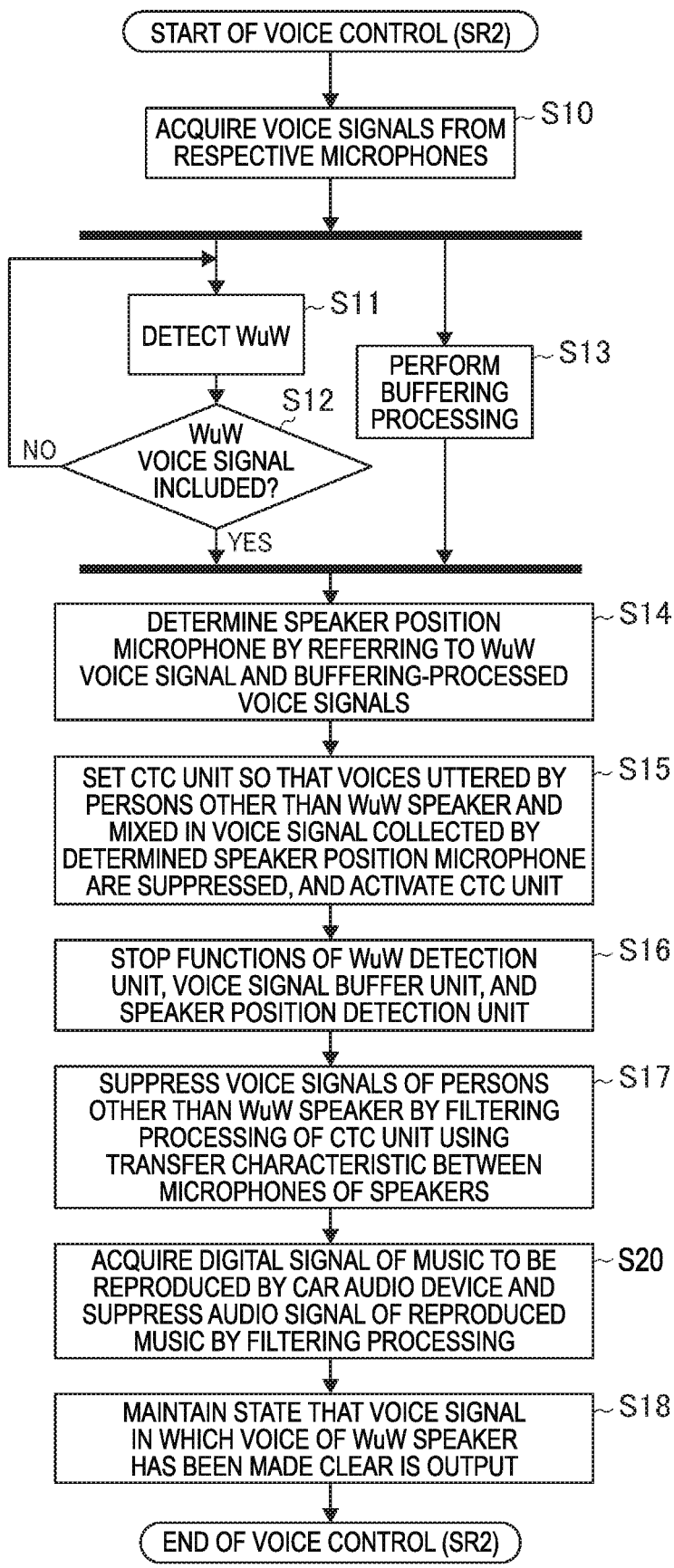

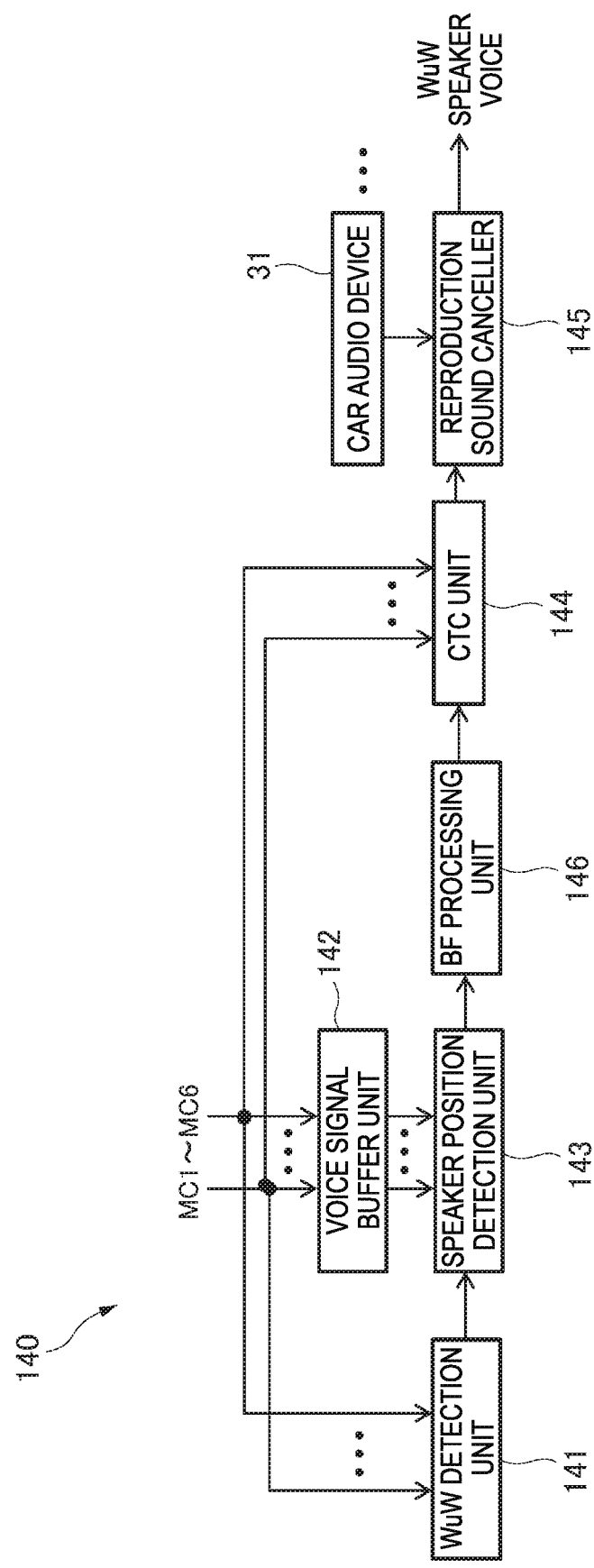

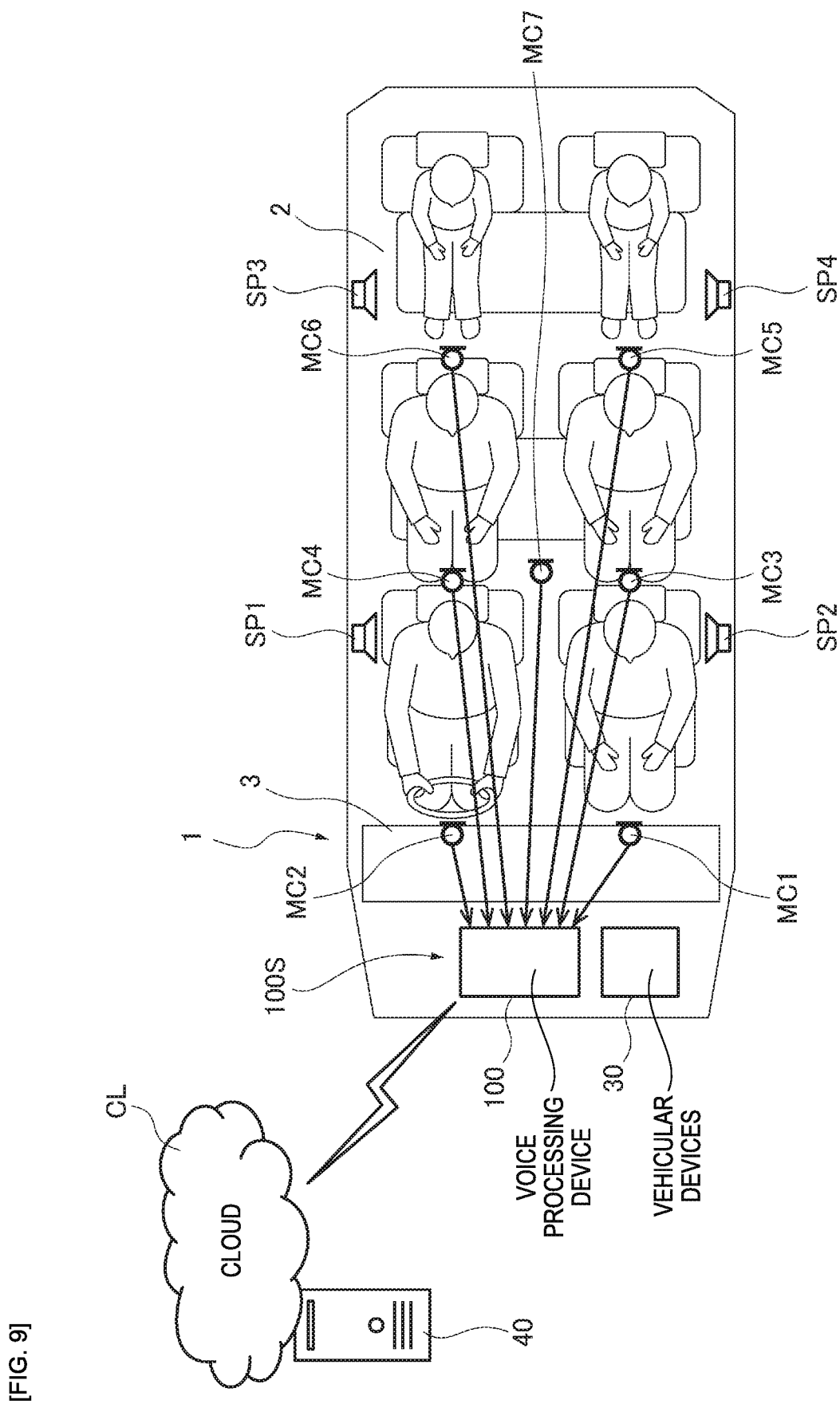

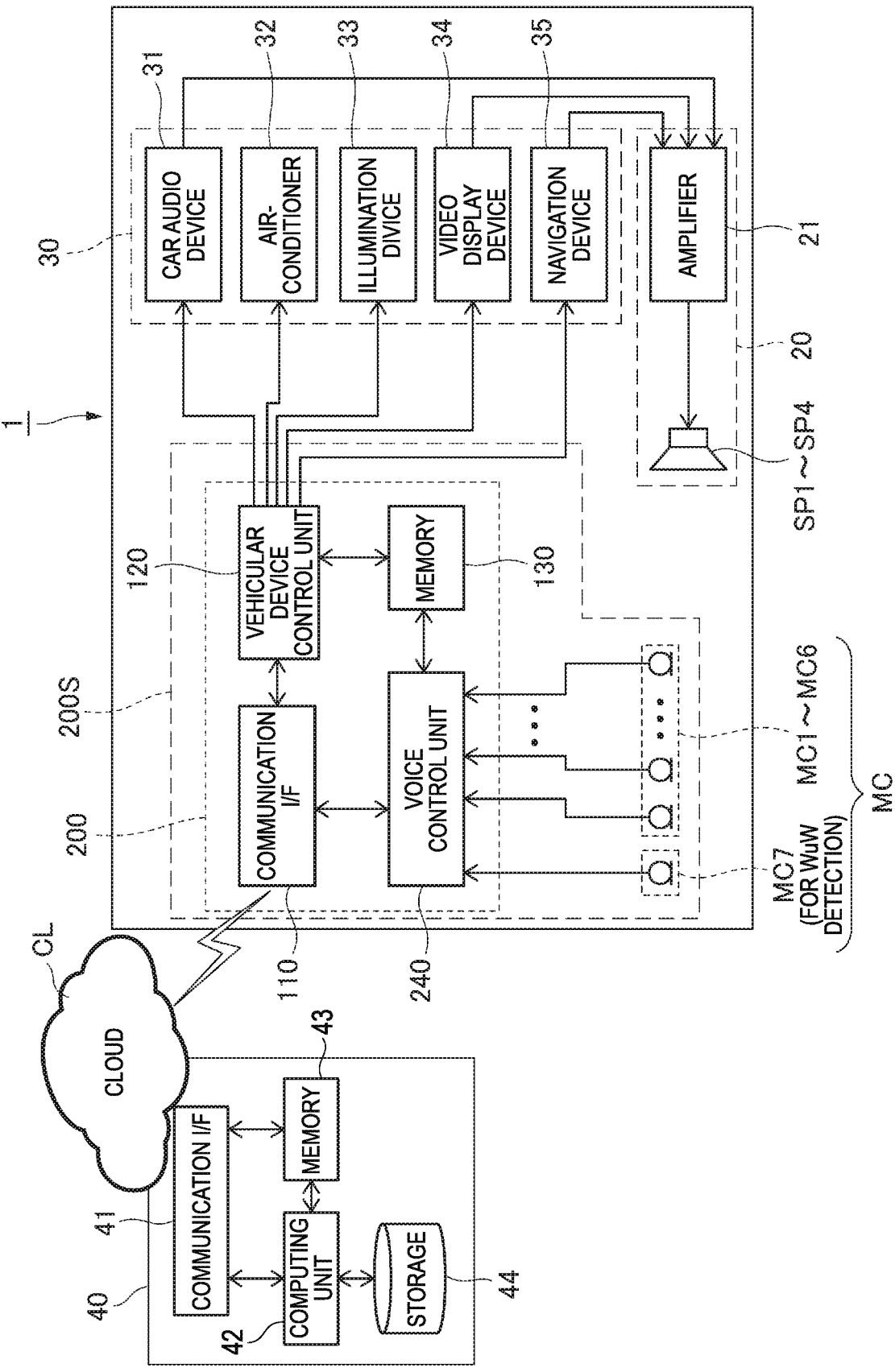
[FIG. 10]

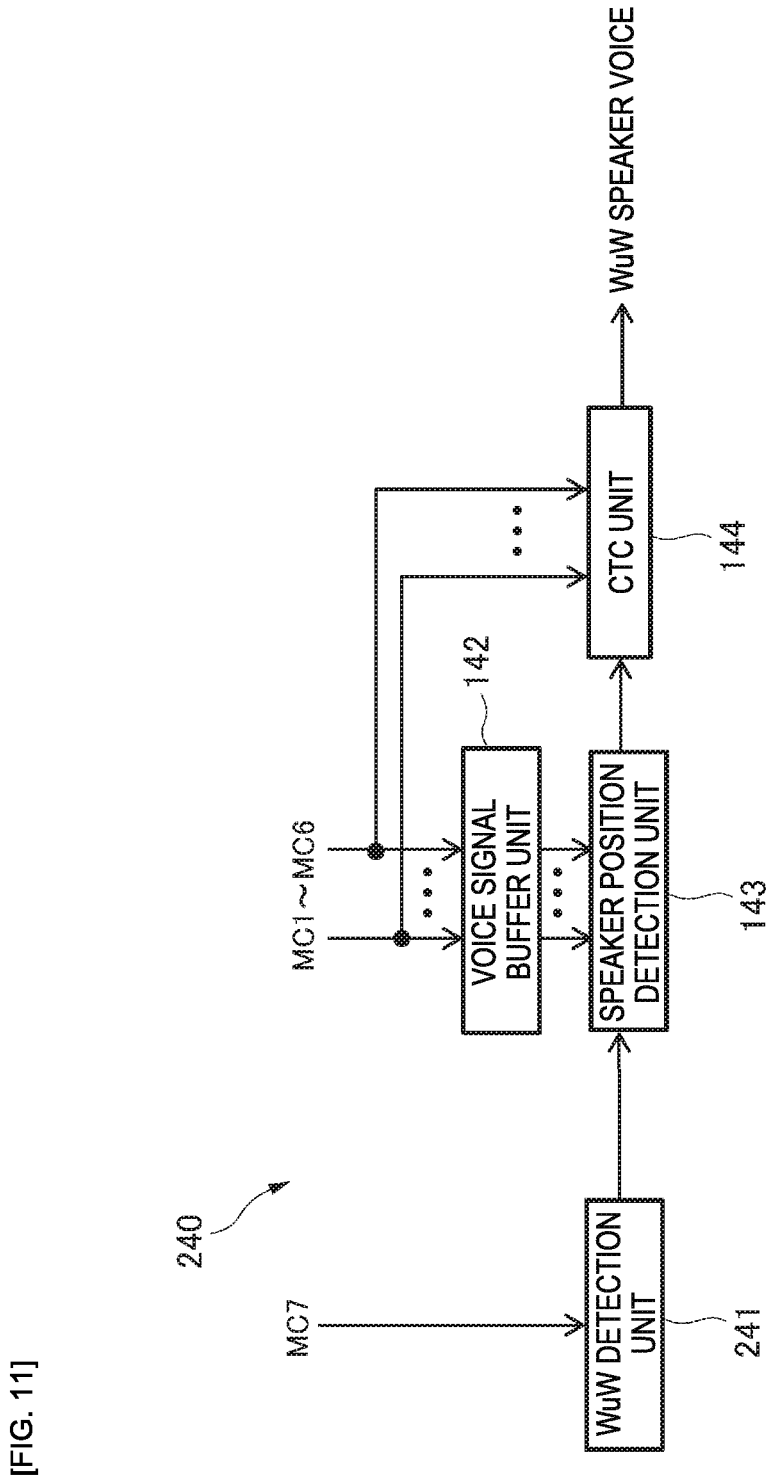

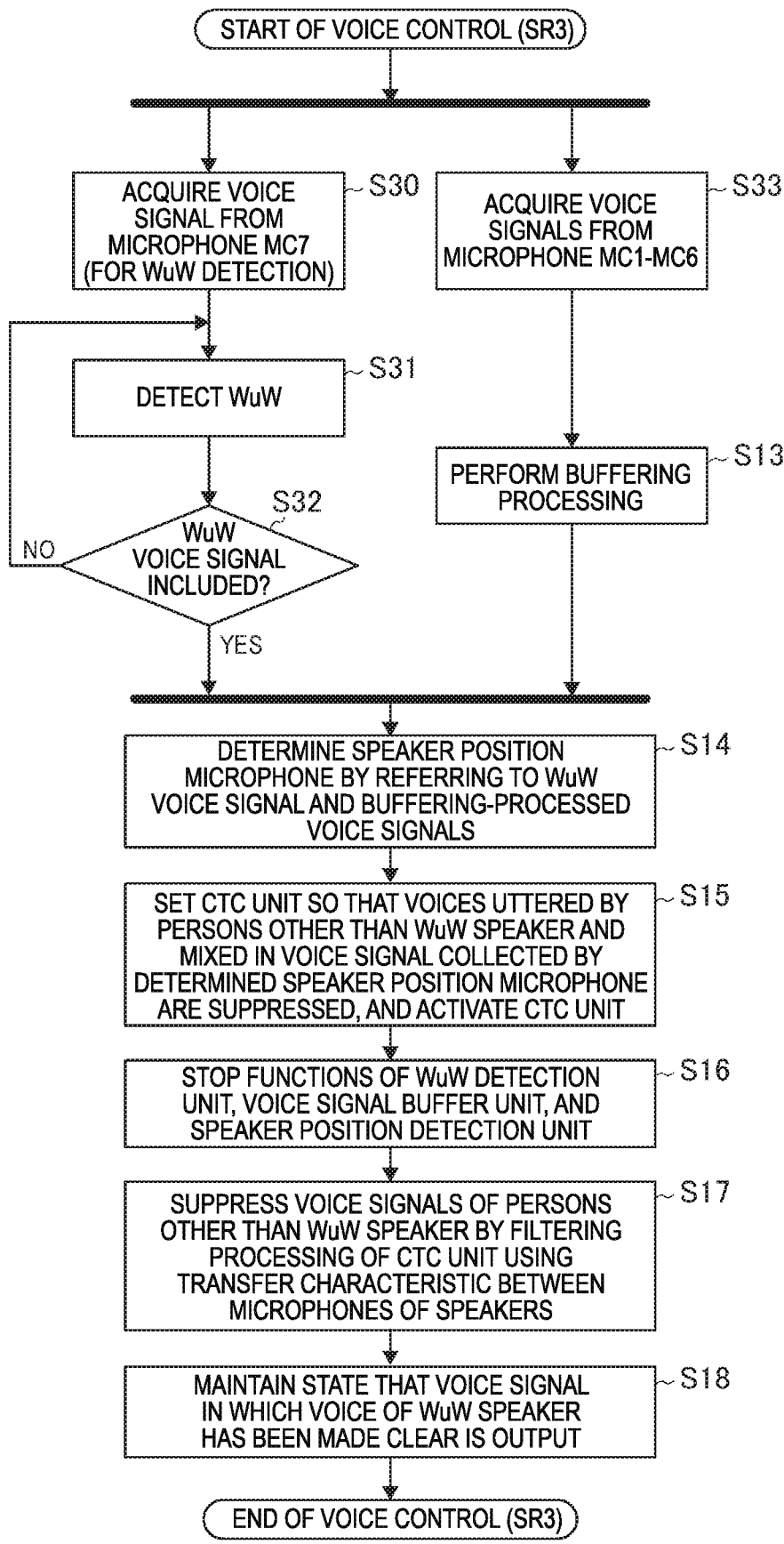

VOICE PROCESSING DEVICE, VOICE PROCESSING METHOD AND VOICE PROCESSING SYSTEM

TECHNICAL FIELD

The present disclosure relates to a voice processing device and a voice processing system that are installed in a vehicle in which plural different microphones are arranged so as to correspond to plural respective seats as well as to a voice processing method that is performed by the voice processing device.

BACKGROUND ART

It is being studied to install, in a relatively large vehicle such as a mini-van, a wagon car, or a one-box car in which plural seats arranged in the front-rear direction of the vehicle (e.g., in three rows), a voice-related technique that enables a communication or input/output between passengers sitting in the rear seats (e.g., family members or friends of the driver) and the driver setting in the driver seat and a vehicular device using microphones and speakers installed in the respective seats, for example, a conversation between the driver and the passengers or sending of car audio music to the rear seats.

On the other hand, in recent years, many vehicles equipped with a communication interface have come to appear. The communication interface has a wireless communication function and is constructed so as to serve for a cellphone network (cellular network), a wireless LAN (local area network), or the like, and a network environment has come to be established also in vehicles. The driver and other persons can receive various services during a drive by accessing, for example, a cloud computing system (hereinafter also referred to simply as a "cloud") on the Internet via such a communication interface.

In the above circumstances, development of an automatic voice recognition system that is one of voice-related techniques using a cloud and is employed in household equipment etc. is being accelerated. This automatic voice recognition system is spreading as a human-machine interface for receiving services on the Internet. The automatic voice recognition system is to allow a control device such as a computer to recognize the content of a voice uttered by a human by, for example, converting it into text data. The automatic voice recognition system is an interface to replace keyboard inputting using fingers of a human and makes it possible to instruct a computer or the like by a manipulation that is closer to a natural behavior of a human. In particular, in vehicles, since the fingers of the driver are used for steering wheel manipulations during a conventional drive mainly carried out by the driver or during an autonomous drive of, for example, the autonomous drive level 3, there is necessity, that is, a motive, for introducing a voice-related technique of automatic voice recognition to vehicles.

According to NHTSA (National Highway Traffic Safety Administration), autonomous driving is classified into no autonomous driving (level 0), driver assist (level 1), partial autonomous driving (level 2), conditional autonomous driving (level 3), high-level autonomous driving (level 4), and complete autonomous driving (level 5). In level 3, driving is led by an autonomous drive system but driving by a human is requested when necessary. The level 3 autonomous drive system has come to be put into practical use recently.

Among conventional techniques relating to a voice-related technique of automatic voice recognition is a technique that it is judged whether uttered audio data (voice signal) corresponds to a hot word, a hot word voice fingerprint of audio data judged to correspond to the hot word is generated, and access to a computer device corresponding to the uttered audio data is invalidated if the generated hot word voice fingerprint coincides with a hot word audio fingerprint that was stored before (refer to Patent document 1, for example).

The term "hot word" means a preset reserved voice to be used for causing a system or a control device to perform a corresponding operation. The hot word is a prescribed word(s) (particular word(s)) to serve as a trigger to transmit a command or an instruction and is also called a "WuW" (wake-up word). In this specification, the following description will be made with this prescribed word referred to as a WuW or a wake-up word.

CITATION LIST

Patent Literature

Patent document 1: JP-A-2017-076117

SUMMARY OF INVENTION

Technical Problem

However, the technique disclosed in the above Patent document 1 is based on an assumption that a hot word, that is, a WuW, is uttered in a silent environment. That is, no consideration is given to from which direction a WuW has been uttered in a vehicle when it is used in an environment in which vibration occurs and noise is generated by vehicular devices all the time as in a movable body such as a vehicle.

As a result, when a specific instruction voice for commanding activation of a vehicular device is uttered following a WuW in a vehicle in which vibration and noise are always generated, from which direction the WuW has been uttered may not be detected even if the technique of the above Patent document 1 is used. The vehicular device may not be activated quickly based on detection of the WuW: there is room for improvement in this respect.

The concept of the present disclosure has been conceived in view of the above circumstances in the art and an object of the disclosure is therefore to provide a voice processing device, a voice processing method, and a voice processing system for detecting, quickly, an utterance direction of a prescribed word (e.g., wake-up word) uttered in a vehicle and extracting a voice that a speaker of the prescribed word utters following the prescribed word exclusively of voices of persons other than the speaker.

Solution to Problem

The present disclosure provides a voice processing device installed in a vehicle in which plural different microphones are arranged so as to correspond to respective seats, including a storing unit which stores voice signals of a prescribed period collected by the plural different microphones, respectively; a word detection unit which detects presence/absence of a voice of a prescribed word uttered by a speaker sitting in the vehicle based on voice signals collected by the plural different microphones, respectively; a microphone determining unit which determines, as a speaker position microphone, a microphone that has collected a voice signal of the prescribed word based on characteristics of the voice signals of the prescribed period stored by the storing unit when a voice of the prescribed word has been detected; and a voice processing unit which outputs a voice uttered by the speaker while suppressing a voice uttered by a passenger other than the speaker using the voice signals of the prescribed period stored by the storing unit and information relating to the speaker position microphone.

Furthermore, the disclosure provides a voice processing method employed in a voice processing device installed in a vehicle in which plural different microphones are arranged so as to correspond to respective seats, including the steps of storing, in a storing unit, voice signals of a prescribed period collected by the plural different microphones, respectively; detecting presence/absence of a voice of a prescribed word uttered by a speaker sitting in the vehicle based on voice signals collected by the plural different microphones, respectively; determining, as a speaker position microphone, a microphone that has collected a voice signal of the prescribed word based on characteristics of the voice signals of the prescribed period stored by the storing unit when a voice of the prescribed word has been detected; and outputting a voice uttered by the speaker while suppressing a voice uttered by a passenger other than the speaker using the voice signals of the prescribed period stored by the storing unit and information relating to the speaker position microphone.

Still further, the disclosure provides a voice processing system including a voice processing device installed in a vehicle in which plural different microphones are arranged so as to correspond to respective seats and a control device which controls a vehicular device installed in the vehicle, wherein the voice processing device stores, in a storing unit, voice signals of a prescribed period collected by the plural different microphones, respectively; detects presence/absence of a voice of a prescribed word uttered by a speaker sitting in the vehicle based on voice signals collected by the plural different microphones, respectively; determines, as a speaker position microphone, a microphone that has collected a voice signal of the prescribed word based on characteristics of the voice signals of the prescribed period stored by the storing unit when a voice of the prescribed word has been detected; outputs a voice uttered by the speaker while suppressing a voice uttered by a passenger other than the speaker using the voice signals of the prescribed period stored by the storing unit and information relating to the speaker position microphone; and acquires a recognition result of the voice uttered by the speaker; and the control device controls operation of the vehicular device according to the recognition result of the voice uttered by the speaker.

Advantageous Effects of Invention

According to the disclosure, an utterance direction of a prescribed word (e.g., wake-up word) uttered in a vehicle is detected quickly and a voice uttered following the prescribed word by the speaker of the prescribed word is extracted exclusively of voices of persons other than the speaker. This extraction makes it possible to suppress an event that voices of persons other than the speaker are output being mixed with a voice of the speaker after the detection of the prescribed word and hence to output the voice of the speaker clearly without delay. As a result, the accuracy and performance of automatic voice recognition or the like can be increased or enhanced and a vehicular device can be activated quickly in response to the detection of the prescribed word.

BRIEF DESCRIPTION OF DRAWINGS

FIG. 1 is a top view of a vehicle employed in a first embodiment.

FIG. 2 is a functional block diagram for description of the configuration of a voice processing system according to the first embodiment.

FIG. 3 is a processing block diagram for description of the configuration of a voice control unit employed in the first embodiment.

FIG. 4 is a flowchart showing an operation procedure of the voice control unit employed in the first embodiment.

FIG. 5 is a sequence diagram showing the procedure of operations performed between a voice processing device and a voice recognition server.

FIG. 6 is a processing block diagram showing how a voice control unit according to a first modification of the first embodiment operates.

FIG. 7 is a flowchart showing an operation procedure of the voice control unit according to the first modification of the first embodiment.

FIG. 8 is a processing block diagram showing how a voice control unit according to a second modification of the first embodiment operates.

FIG. 9 is a top view of a vehicle employed in a second embodiment.

FIG. 10 is a functional block diagram for description of the configuration of a system including a voice processing according to the second embodiment.

FIG. 11 is a processing block diagram for description of a signal processing operation of a voice processing unit employed in the second embodiment.

FIG. 12 is a flowchart showing an operation procedure of the voice processing unit according to the second embodiment.

DESCRIPTION OF EMBODIMENTS

Each embodiment in which a voice processing device, a voice processing method, and a voice processing system according to the present disclosure that can be installed in a vehicle are disclosed in a specific manner will be hereinafter described in detail by referring to the drawings when necessary. However, unnecessarily detailed descriptions may be avoided. For example, already well-known items may not be described in detail and constituent elements having substantially the same ones already described may not be described redundantly. This is to prevent the following description from becoming unduly redundant and thereby facilitate understanding of those skilled in the art. The following description and the accompanying drawings are provided to allow those skilled in the art to understand the disclosure thoroughly and is not intended to restrict the subject matter of the disclosure to the claims.

The term "unit" and "device" used in a first embodiment are not limited to mere physical structures implemented by hardware and includes things in which functions of those structures are implemented by software such as a program. Furthermore, a function of one structure may be implemented by two or more physical structures or functions of two or more structures may be implemented by, for example, one physical structure.

A voice processing device, a voice processing method, and a voice processing system according to each embodiment that can be installed in a vehicle are installed in a vehicle. For example, plural different microphones are installed in plural respective seats and voice signals collected by the plural different microphones are subjected to voice processing as appropriate.

Embodiment 1

A voice processing device 100, a voice processing method, and a voice processing system 100S according to the first embodiment that can be installed in a vehicle 1 will be described with reference to FIGS. 1-8.

First, the configuration of the vehicle 1 employed in the first embodiment will be described with reference to FIG. 1. FIG. 1 is a top view of the vehicle 1 employed in the first embodiment.

As shown in FIG. 1, the vehicle 1 is an example automobile that is an automobile as prescribed in the Load Transport Vehicle Law and is capable of autonomous running. The voice processing system 100S according to the first embodiment is installed in the vehicle 1.

The vehicle 1 has a vehicle body 2 that constitutes the vehicle 1. The vehicle 1 is a relatively large vehicle such as a mini-van, a wagon car, or a one-box car in which plural seats arranged in the front-rear direction (e.g., in three rows). An instrument panel 3 is disposed in front of the driver sitting in a driver seat in the vehicle body 2. A navigation device 35 (see FIG. 2) which is an example vehicular device is also installed inside the vehicle body 2 and is configured so as to include a DSP (digital signal processor).

Plural (e.g., six in the first embodiment) different microphones MC1-MC6 which are arranged so as to correspond to plural respective seats, plural (e.g., four in the first embodiment) vehicular speakers SP1-SP4 of an audio output device 20 (described later) which are likewise arranged so as to correspond to plural respective seats, and the voice processing device 100 for processing voice signals that are input from the plural microphones MC1-MC6, and one or more vehicular devices 30 installed in the vehicle are installed inside the vehicle body 2 of the vehicle 1.

Two of the plural microphones MC1-MC6 are arranged so as to correspond to the driver seat for the driver (first-row seats), second seats for passengers (second-row seats), or third seats for passengers (third-row seats). With this arrangement, the plural microphones MC1-MC6 can pick up a voice uttered by the driver or a passenger in the entire area in the vehicle body 2. In the first embodiment, the microphones MC1-MC6 may be either directional microphones or unidirectional microphones.

The pair of speakers SP1 and SP2 of the plural vehicular speakers SP1-SP4 are built in the doors corresponding to the driver seat for the driver and the front passenger seat, respectively. The remaining pair of seats SP3 and SP4 are built in respective side wall portions of the vehicle body 2 located between the second-row seats for passengers and the third-row seats for passengers. With this arrangement, the plural vehicular speakers SP1-SP4 can output an audio signal that is output from the voice processing device 100 or a vehicular device 30 to the driver or a passenger sitting in the vehicle 1. In the first embodiment, like the microphones MC1-MC6, the vehicular speakers SP1-SP4 may be either directional speakers or unidirectional speakers. At least one of the vehicular speakers SP1-SP4 may be disposed in the instrument panel 3 of the vehicle 1, in which case the driver or the passenger in the front passenger seat can recognize the content of a voice more clearly.

The voice processing device 100 and the vehicular devices 30 are disposed in the vicinity of the instrument panel 3. The voice processing device 100 and the vehicular devices 30 are connected to a cloud CL via a wireless communication network. A voice recognition server 40 is provided on the cloud CL. In the first embodiment, the voice processing system 100S is configured so as to include the plural microphones MC1-MC6 and the voice processing device 100.

Next, the system configuration of the voice processing system 100S will be described with reference to FIG. 2. FIG. 2 is a functional block diagram for description of the configuration of the voice processing system 100S.

One or more audio output devices 20, plural vehicular devices 30, and the voice processing system 100S according to the first embodiment are installed in the vehicle 1.

The (or each) audio output device 20 includes an amplifier (example amplification circuit) 21 for amplifying an audio signal that is output from a vehicular device 30 and the above-mentioned plural vehicular speakers SP1-SP4 for outputting the amplified audio signal. As mentioned above, the plural vehicular speakers SP1-SP4 are built in the plural doors of the vehicle 1, the instrument panel 3 of the vehicle 1, etc.

The plural vehicular devices 30 are a generic term of various devices installed in the vehicle body 2. More specifically, the plural vehicular devices 30 include a car audio device 31, an air-conditioner 32, an illumination device 33, a video display device 34, a navigation device 35, etc. Each of these vehicular devices 30 is connected to a vehicular device control unit 120 of the voice processing device 100.

The car audio device 31, which is an audio device, receives a radio broadcast and reproduces, for example, music from a musical medium such as a CD (Compact Disc) or an electronic musical file.

The air-conditioner 32 adjusts the temperature and humidity in the vehicle body 2 and thereby establish a comfortable environment for the driver and the passengers. The air-conditioner 32 defrosts the windshield and the side window glasses of the vehicle body 2 by blowing dry air over them.

The illumination device 33, which is necessary for a safe drive, illuminates an area ahead of the vehicle 1 and notifies persons existing around the vehicle 1 of an action of the vehicle 1.

The video display device 34 is configured so as to include, for example, a liquid crystal panel as an image display unit and is installed in the instrument panel 3 in an integrated manner. The video display device 34 displays image information to the driver and the passengers when appropriate.

The navigation device 35 performs guidance by showing a current position of the vehicle 1 and a route to a destination while the vehicle 1 in running. Route guidance is performed by displaying map information, arrow information, etc. on the above-described video display device 34 using, for example, the video display device 34 etc. in common. Although in the first embodiment the car audio device 31, the air-conditioner 32, the illumination device 33, the video display device 34, and the navigation device 35 were enumerated above as examples of the vehicular devices 30, they are just examples and it is not intended to restrict the vehicular devices 30 to them.

The vehicular devices 30 such as the car audio device 31, the video display device 34, and the navigation device 35 are connected to the amplifier 21 of the audio output device 20, whereby an audio signal is output from the vehicular devices 30. The audio signal is finally output to the vehicle body 2 through the vehicular speakers SP1-SP4 of the audio output device 20.

As mentioned above, the voice processing system 100S is configured so as to include the plural microphones MC1-MC6 and the voice processing device 100. The voice processing device 100 includes a communication interface 110, a vehicular device control unit (an example of a "control device") 120, a memory 130, and a voice control unit (an example of a "voice processing unit") 140. In FIG. 2, the communication interface is written as a "communication I/F" for convenience. All or part of the functions of the voice processing device 100 are implanted by software, and all or part of the software may be run on the DSP of the navigation device 35. In this case, the manufacturing cost can be suppressed because the existing hardware resources as they are.

Having a wireless communication function, the communication interface 110 is connected to the cloud CL via a wireless communication network and serves for a wireless communication. The communication interface 110 can use, as a wireless communication network, a cellphone network (cellular network), a wireless LAN, or the like.

The voice recognition server 40 is provided in the cloud CL. The voice recognition server 40 likewise includes a communication interface 41 and further has a computing unit 42, a memory 43, and a storage 44. The computing unit 42 is a CPU (central processing unit) for performing data processing and executing a prescribed algorithm. The memory 43 is a RAM (random access memory) for storing prescribed data and an algorithm temporarily. The storage 44 is a large-capacity storage device (e.g., HDD (hard disk drive) or an SSD (solid-state drive)) for storing a large amount of data etc. and is configured so as to include one or more magnetic storage devices, optical storage devices, or the like.

The vehicular device control unit 120, which is configured using, for example, a CPU, a DSP, or an FPGA (field programmable gate array), controls the operation of each vehicular device 30 by controlling its turning-on/off and instructing it to announce its operation status by voice based on a recognition result of an automatic voice processing system (described later). The memory 130 of the voice processing device 100 functions as a temporary storage device for enabling exchange of prescribed data, a program or the like, between the vehicular device control unit 120 and the voice control unit 140.

In the first embodiment, the voice processing system is realized so as to include the vehicular voice processing device 100 and the voice recognition server 40 installed on the cloud CL. That is, the voice processing device 100 takes in a voice signal picked up by the plural microphones MC1-MC6. The voice processing device 100 subjects the voice signal to voice processing and then transmits a resulting voice signal to the cloud CL and the voice recognition server 40 via the communication interface 110. Receiving the transmitted voice signal, the voice recognition server 40 converts the received voice signal into text data by performing voice recognition based on a corpus, for example. The text data is used for various purposes such as generation of a system command or data inputting or use of a prescribed service.

The text data is converted or interpreted according to a prescribed automatic voice recognition algorithm. The automatic voice recognition algorithm is installed in the voice recognition server 40 and is generated by artificial intelligence (AI) implemented by deep learning, for example. By virtue of such voice recognition and artificial intelligence, by uttering a voice, the driver or a passenger can receive, for example, any of various services provided by other servers on the cloud CL such as schedule management, sending an inquiry to a support desk, or the like. Furthermore, the driver and the passengers can give a manipulation instruction to each vehicular device 30 (e.g., music reproduction) via the vehicular device control unit 120 of the voice processing device 100 by voice.

The automatic voice processing system functions substantially using, as a trigger, a prescribed word(s) uttered before issuance of an instruction to a device. The first embodiment employs a WuW (wake-up word) as an example of the prescribed word(s). Since a WuW voice uttered by a human is to serve as a key for allowing access to the system, it is defined as a prescribed word in advance so as to be detected by the system. Thus, the WuW is stored as appropriate by, for example, the memory 130 of the voice processing device 100 in advance. Examples of the WuW are "Hello, my computer" and "Hey, vehicle." However, the WuW is not limited to these phrases and various phrases and words can be employed; that is, a WuW can be set in a desired manner.

Upon detection of a phrase including a WuW, the automatic voice processing system is activated (woken up) and its automatic recognition operation is started. By virtue of the system activation using a WuW, the automatic voice processing system need not operate all the time and may be activated or function only when its operation is necessary. This makes it possible to reduce the loads of computation processing of the system, network traffic, etc.

In the first embodiment, such a WuW detection function is provided in the voice control unit 140 of the voice processing device 100. A voice signal matching model relating to WuW detection is set in advance and stored in the memory 130 of the voice processing device 100, for example. For example, a pattern matching dictionary model or an acoustic model is employed as the voice signal matching model; however, the voice signal matching model is not limited to them. Various models and other voice signal matching model techniques can be employed as appropriate.

Next, the configuration of the voice control unit 140 will be described with reference to FIG. 3. FIG. 3 is a signal processing block diagram for description of the configuration of the voice control unit 140.

As shown in FIG. 3, the voice control unit 140 has a WuW detection unit (an example of a "word detection unit") 141, an voice signal buffer unit (an example of a "storing unit") 142, a speaker position detection unit (an example of a "microphone determining unit") 143, and a CTC (crosstalk canceller) unit (an example of a "voice processing unit") 144. An A/D converter (not shown) is provided in the voice control unit 140. The A/D converter performs digital conversion of each of voice signals of the microphones MC1-MC6 by quantizing it at a prescribed sampling cycle and causes the voice control unit 140 to take in a resulting signal.

The WuW detection unit 141 directly acquires a voice signal collected by each of the plural different microphones MC1-MC6. The WuW detection unit 141 has acquired, in advance, a voice signal matching model stored in the memory 130 and stores the acquired voice signal matching model inside. The WuW detection unit 141 detects presence/absence of a WuW voice signal generated from a particular speaker based on the received voice signal according to an algorithm corresponding to the prescribed voice signal matching model. If detecting a WuW voice, the WuW detection unit 141 sends the detection information to the speaker position detection unit 143 as a trigger signal. The WuW detection unit 141 may be provided with a storage and the above-mentioned voice signal matching model may be stored in the storage in advance. The matching algorithm may be generated by artificial intelligence (AI) implemented by deep learning, for example.

The voice signal buffer unit 142 is constituted by a storage circuit such as a RAM and always stores, individually, received voice signals of a prescribed period (e.g., 2 to 3 sec) of the microphones MC1-MC6. If the capacity of the voice signal buffer unit 142 is filled up, an old part of each of voice signals of the microphones MC1-MC6 is updated (overwritten), whereby latest voice data from the present time to immediately before (i.e., a time before a prescribed period)

is stored repeatedly. In the following, such series processing may be referred to as "buffering processing." Instead of providing the voice signal buffer unit 142 inside the voice control unit 140, its function may be commonized with the function of the memory 130, in which case the voice control unit 140 may acquire voice signals buffered in the memory 130 of the voice processing device 100 as appropriate. This makes it possible to reduce the manufacturing cost by decreasing the number of components.

When receiving a trigger signal sent from the WuW detection unit 141, the speaker position detection unit 143 sets a time of the reception as a reference time. The speaker position detection unit 143 acquires voice signals of the past prescribed period from the reception time (i.e., buffering-processed signals) individually from the voice signal buffer unit 142. The speaker position detection unit 143 refers to the WuW voice signal and the individual buffering-processed voice signals and thereby detects a spatial position of the WuW speaker in the vehicle body 2 according to a sound source direction estimation algorithm, for example.

In the sound source direction estimation algorithm, a spatial position is detected, for example, through detection of time differences between voice signals of the microphones MC1-MC6. A spatial position can be detected by a method other than the method with detection of time differences; for example, it is possible to detect a position by performing Fourier conversion and spectrum analysis on the voice signals of the microphones MC1-MC6 and further analyzing voice waveforms, frequencies, voice levels, etc. of the respective voice signals.

In this manner, when a WuW voice has been detected, the speaker position detection unit 143 detects a spatial position of the speaker who uttered the WuW based on characteristics of voice signals of the prescribed period that are stored in the voice signal buffer unit 142. In this manner, the speaker position detection unit 143 determines, as a speaker position microphone, a microphone that is located closest to that speaker (i.e., one of the microphones MC1-MC6), that is, a microphone that picked up the WuW voice. The speaker position detection unit 143 sends, for example, an identification number of the speaker position microphone to the CTC unit 144.

After the speaker position detection unit 143 has determined the speaker position microphone, the voice signal buffer unit 142 stops the buffering processing. The WuW detection unit 141 also stops its operation. These make it possible to lower the processing load of the voice control unit 140.

The CTC unit 144 acquires voice signals of the microphones MC1-MC6 directly in real time. The CTC unit 144 has an adaptive filter (not shown) and adders (not shown). To make it possible to extract only a voice uttered by the WuW speaker, the CTC unit 144 cancels out voices uttered by the persons other than the WuW speaker by adding a dummy voice signal (in other words, cancellation signal) generated by the adaptive filter to a voice signal collected by the speaker position microphone. In this manner, the CTC unit 144 extracts and outputs only a voice that is as close to a voice uttered by the WuW speaker as possible by suppressing voices uttered by the persons other than the WuW speaker using voice signals of the prescriber period stored in the voice signal buffer unit 142 and the information relating to the speaker position microphone.

The adaptive filter grows while updating its filter coefficients until its transfer characteristic becomes equivalent to a transfer characteristic between the microphones MC1-MC6 according to, for example, a learning algorithm by referring to all the voice signals collected by the microphones MC1-MC6 including the speaker position microphone. Processing the voice signals using the adaptive filter makes it possible to generate a dummy signal for canceling out the voices of the persons other than the speaker. Any of various filters other than such an adaptive filter may be used as long as they can cancel out voices other than a WuW speaker. For example, a filter that reflects measurement results obtained by actually measuring a transfer characteristic between the microphones MC1-MC6 in advance may be designed in advance and installed. In addition to the fact that the CTC unit 144 performs processing of the adaptive filter, a configuration may be made so that only a voice signal collected by the speaker position microphone is input to the voice control unit 140 by lowering the volume levels of the microphones other than the speaker position microphone.

Next, how the voice control unit 140 operates and the procedure of operations performed between the voice processing device 100 and the voice recognition server 40 will be described with reference to FIGS. 4 and 5. FIG. 4 is a flowchart showing an operation procedure of the voice control unit 140. FIG. 5 is a sequence diagram showing operations performed between the voice processing device 100 and the voice recognition server 40. FIG. 4 shows an operation procedure of a subroutine SR1 shown in FIG. 5. First, the operation procedure of the voice control unit 140, that is, the subroutine SR1, will be described with reference to FIG. 4.

As shown in FIG. 4, in the subroutine SR1, the voice control unit 140 acquires voice signals collected by the respective microphones MC1-MC6 and, first, inputs these voice signals to the WuW detection unit 141 and the voice signal buffer unit 142 (S10). The WuW detection unit 141 starts detecting a WuW voice signal from the received voice signals in parallel according to a prescribed voice signal matching algorithm (S11). The WuW detection unit 141 judges whether a WuW voice signal is included in one of the received voice signals (S12). If judging that a WuW voice signal exists, the WuW detection unit 141 moves to step S14. On the other hand, if judging that no WuW voice signal exists, the WuW detection unit 141 returns to step S11.

Parallel with the execution of steps S11 and S12 by the WuW detection unit 141, the voice signal buffer unit 142 always stores portions, of a prescribed period in length, of the received voice signals of the microphones MC1-MC6 individually. That is, the voice signal buffer unit 142 performs buffering processing on each of the voice signals of the microphones MC1-MC6 (S13).

The speaker position detection unit 143 detects a spatial position of a WuW speaker in the vehicle body 2 by referring to the WuW voice signal and the buffering-processed voice signals. As a result, the speaker position detection unit 143 determines, as a speaker position microphone, the microphone that picked up the WuW voice (S14). Following the determination of the speaker position microphone, the voice control unit 140 sets filter coefficients of the adaptive filter of the CTC unit 144 so that voices uttered by the persons other than the WuW speaker and mixed in a voice signal collected by the speaker position microphone are suppressed and causes the CTC unit 144 to function (i.e., activates it) (S15).

In setting the CTC unit 144, the WuW detection unit 141, the voice signal buffer unit 142, and the speaker position detection unit 143 are caused to stop functioning because they need not operate (e.g., the buffering processing need not be performed) at step S15 and the following steps (including the main routine shown in FIG. 5) (S16).

Upon the setting of filter coefficients of the adaptive filter of the CTC unit 144, the CTC unit 144 acquires a voice signal of the speaker position microphone directly and suppresses voices uttered by the persons other than the WuW speaker. In doing so, the CTC unit 144 performs filtering processing on the voice signal using the adaptive filter (S17). The voice control unit 140 outputs a voice signal in which the voice of the speaker who uttered the WuW has been made clear, and maintains the output state with the filtering processing (S18).

That is, a voice that is uttered after utterance of the WuW and determination of the speaker position microphone used is always subjected to the filtering processing in the CTC unit 144. As a result, the voice uttered by the driver or each passenger other than the WuW speaker is canceled out and a voice that is mainly constituted by the voice uttered by the WuW speaker continues to be output. Execution of the other part of the operation procedure of the main routine shown in FIG. 5 is started as soon as the above series of steps S10-S18 are executed and the execution of the subroutine SR1 is finished.

As shown in FIG. 5, the voice processing device 100 moves to step S100 as soon as the execution of the subroutine SR1 by the voice control unit 140 of the voice processing device 100 is finished. The voice control unit 140 transmits a prescribed voice recognition activation command to the voice recognition server 40 using the communication interface 110 (S100).

First, the voice recognition server 40 judges whether it has received the voice recognition activation command from the voice control unit 140 of the voice processing device 100 (S102). If judging that the voice recognition activation command has not been received yet, the voice recognition server 40 returns to step S101 and establishes a standby mode. That is, the voice recognition server 40 keeps the standby mode until reception of the voice recognition activation command. On the other hand, if judging that it has received the voice recognition activation command, the voice recognition server 40 moves to step S104. The voice recognition activation command is an instruction sentence that functions as a trigger for urging the voice recognition server 40 to perform automatic voice recognition. A configuration may be made so that the voice recognition activation command is transmitted to the voice recognition server 40 at the same time as the WuW detection unit 141 detects a WuW voice.

After executing step S100, the voice control unit 140 transmits the voice signal as filtering-processed by the CTC unit 144 to the voice recognition server 40 (S103). The voice recognition server 40 receives this voice signal and performs voice recognition in the manner described above. The voice recognition server 40 transmits a voice recognition result to the voice control unit 140 using the communication interface 41 (S104). Incidentally, a voice signal that is output from the voice control unit 140 after the execution of the subroutine SR1 has been subjected to the filtering processing in the CTC unit 144 and hence is mainly constituted by a voice uttered by the WuW speaker. That is, the same steps as steps S17 and S18 of the subroutine SR1 are executed at step S103.

The vehicular device control unit 120 of the voice processing device 100 controls the operation of each vehicular device 30 according to the recognition result of the voice recognition server 40 (S105).

Subsequently, the voice control unit 140 judges whether to finish the voice recognition by detecting whether a prescribed condition is satisfied (S106). If judging that the voice recognition should be finished, the voice control unit 140 moves to step S107. On the other hand, if judging that the voice recognition should not be finished, the voice control unit 140 returns to step S103.

The voice control unit 140 transmits a voice recognition end command to the voice recognition server 40 (S107). The voice recognition server 40 judges whether it has received the voice recognition activation command from the voice control unit 140 (S108). If judging that the voice recognition activation command has been received, the voice recognition server 40 returns to step S101 to establish the waiting mode again. On the other hand, if judging that the voice recognition activation command has not been received, the voice recognition server 40 returns to step S104. The voice recognition server 40 continues the voice recognition unless it receives the voice recognition activation command.

That is, steps S106 and S107 allow the voice control unit 140 to also have, as part of its control functions, a function of causing the operation mode of the device it belongs to from a particular speaker voice output mode (S103) in which voices uttered by passengers other than a voice uttered by a WuW speaker are suppressed to a WuW detection standby mode in which to detect presence/absence of a WuW voice (i.e., SR1: an example of a "prescribed word detection standby mode), when having detected that the prescribed condition has been satisfied.

In the first embodiment, two operation procedures are followed selectively to judge whether the prescribed condition is satisfied. In the first operation procedure relating to the prescribed condition, a stop word (SW: an example of an "end word") that is different from the WuW and means that voice recognition should be finished is defined and set in advance. At step S106, the WuW detection unit 141 of the voice control unit 140 detects presence/absence of the SW (in addition to the WuW) according to a similar algorithm based on a voice signal collected by the speaker position microphone. The voice control unit 140 executes step S106 by judging whether an SW voice has been detected and changes the operation mode of the device to the WuW detection standby mode.

On the other hand, in the second operation procedure relating to the prescribed condition, the voice control unit 140 executes step S106 by judging whether a prescribed period has elapsed from acquisition of a voice uttered by the speaker and changes the operation mode of the device to the WuW detection standby mode.

As described above, at step S106, the voice control unit 140 operates so as to judge whether the condition of one of first operation procedure and the second operation procedure is satisfied.

As described above, the voice processing device 100 according to the first embodiment has the voice signal buffer unit (an example of a "storing unit") 142 for storing voice signals of the prescribed period collected by the plural different microphones MC1-MC6, respectively. The voice processing device 100 has the WuW detection unit (an example of a "word detection unit") 141 for detecting presence/absence of a voice of the WuW (an example of a "prescribed word") uttered by a speaker sitting in the vehicle 1 based on voice signals collected by the plural different microphones MC1-MC6, respectively. The voice processing device 100 has the speaker position detection unit (an example of a "microphone determining unit") 143 for determining, as a speaker position microphone (e.g., microphone MC1), a microphone (e.g., one of the microphone MC1-MC6) that has collected a WuW voice signal based on characteristics of respective voice signals of the prescribed period stored by the voice signal buffer unit 142 when the WuW voice has been detected. The voice processing device 100 has the CTC unit (an example of a "voice processing unit") 144 for outputting a voice uttered by the speaker while suppressing voices uttered by the passengers other than the speaker using voice signals of the prescribed period stored by the voice signal buffer unit 142 and information relating to the speaker position microphone.

Having this configuration, the voice processing device 100 or the voice processing system 100S can quickly detect an utterance direction in which the WuW is uttered in the vehicle 1 and extract a voice that the WuW speaker utters following the WuW exclusively of voices of persons other than the WuW speaker. By performing this extraction, the voice processing device 100 or the voice processing system 100S can output, after the detection of the WuW, the voice uttered by the WuW speaker clearly without delay by suppressing mixing and output of the voices of the persons other than the WuW speaker. As a result, the voice processing device 100 or the voice processing system 100S can increase or enhance the accuracy and activate a vehicular device 30 quickly in response to the detection of the WuW.

The voice processing device 100 further has the voice control unit 140 (an example of the "voice processing unit") for changing the operation mode of the device from the particular speaker voice output mode (S103) in which a voice uttered by the speaker is output and voices uttered by passengers other than the speaker are suppressed to the WuW detection standby mode (SR1, an example of a "prescribed work detection standby mode") in which presence/absence of a voice of the WuW (an example of the "prescribed word") is detected, when having detected satisfaction of the prescribed condition. With this measure, the voice processing device 100 allows itself to operate only when it needs to operate and hence can reduce the number of times of execution of useless processing and prevent occurrence excessive network traffic between itself and the voice recognition server 40.

In the voice processing device 100, the WuW detection unit 141 detects presence/absence of a voice of the SW (an example of a term "end word") that is different from the WuW (an example of the "prescribed word") based on a voice signal collected by the speaker position microphone. In the voice processing device 100, when a voice of the SW that is different from the WuW is detected, the voice control unit 140 judges that the prescribed condition has been satisfied and changes the operation mode of the device to the WuW detection standby mode (SR1, an example of the "prescribed work detection standby mode"). With this measure, the voice processing device 100 allows the WuW speaker himself or herself to finish the operation of the voice processing device 100, whereby the human side (i.e., driver or passenger) can reduce, voluntarily, the number of times of execution of useless processing and prevent occurrence excessive network traffic. Furthermore, the driver or passenger can recognize obviously that the voice processing device 100 has been rendered in the standby state.

In the voice processing device 100, when the prescribed period has elapsed from acquisition of a voice uttered by the speaker, the voice control unit 140 judges that the prescribed condition has been satisfied and changes the operation mode of the device to the WuW detection standby mode (SR1, an example of the "prescribed work detection standby mode"). With this measure, in the voice processing device 100, the device side can finish the operation of the voice processing device 100 automatically without requiring the WuW speaker himself or herself to finish the operation of the voice processing device 100. As such, the voice processing device 100 can automatically suppress occurrence of useless processing and excessive network traffic.

Modification 1 of Embodiment 1

Next, how a voice control unit 140 according to a first modification of the first embodiment operates will be described with reference to FIGS. 6 and 7. FIG. 6 is a processing block diagram showing how the voice control unit 140 according to the first modification operates. FIG. 7 is a flowchart showing an operation procedure of the voice control unit 140 according to the first modification. Portions having the same or equivalent portions in FIGS. 3 and 4 will be given the same or equivalent symbols in the drawings etc. and descriptions therefor will be omitted or simplified.

As shown in FIG. 6, in the first modification, the voice control unit 140 further has a reproduction sound canceller 145 and a noise canceller (not shown). The reproduction sound canceller 145 is also connected to the car audio device (an example of a "music reproduction device") 31 among the plural vehicular devices 30 and receives its output signal in addition to an output signal of the CTC unit 144. More specifically, the same signal (digital signal) as an audio signal that the car audio device 31 outputs to the amplifier 21 of the audio output device 20 is input to the reproduction sound canceller 145 (see FIG. 2). The noise canceller eliminates noise by performing filtering processing of a lowpass filter or the like on an output signal of the reproduction sound canceller 145.

Like the CTC unit 144, the reproduction sound canceller 145 has an adaptive filter (not shown) and an adder (not shown). The adaptive filter of the reproduction sound canceller 145 refers to an audio signal of music to be reproduced by the car audio device 31 and generates a dummy audio signal for the reproduced music. The reproduction sound canceller 145 adds the dummy audio signal for the reproduction music generated by the adaptive filter to a voice signal collected by a speaker position microphone by means of the adder. With this measure, the reproduction sound canceller 145 cancels out an audio signal of reproduced music that is picked up being mixed through the speaker position microphone after being emitted by the vehicular speakers SP1, SP2, SP3, and SP4 and propagating in the vehicle body 2. In this manner, the reproduction sound canceller 145 suppresses reproduction audio signals that are generated by the plural different microphones MC1-MC6 by picking up reproduced music (an example of a "reproduction sound") of the car audio device 31 installed in the vehicle 1 and would otherwise be mixed in an output audio signal of the voice control unit 140.

As shown in FIG. 7, the process to be executed by the reproduction sound canceller 145 is executed after step S17 that is executed by the CTC unit 144. The reproduction sound canceller 145 acquires an audio signal of music to be reproduced by the car audio device 31 and cancels out an audio signal of reproduced music that is collected being mixed through the speaker position microphone by means of the above filtering processing (S20). After the execution of this step, the voice control unit 140 outputs a voice signal of a clear voice of the speaker who uttered the WuW that is obtained by the filtering processing performed by both of the CTC unit 144 and the reproduction sound canceller 145 and maintains this output state (step S18).

As described above, the voice processing device 100 according to the first modification of the first embodiment further has the reproduction sound canceller 145 which suppresses a reproduction sound signal that is generated by the plural different microphones MC1-MC6 by picking up reproduction music (an example of a reproduction sound) of the car audio device 31 installed in the vehicle 1 and would otherwise be mixed in an output audio signal of the voice control unit (an example of the music reproduction device) 140. With this measure, the reproduction sound canceller 145 can cancel out an audio signal of reproduced music that is picked up being mixed through the speaker position microphone after being emitted by the vehicular speakers SP1, SP2, SP3, and SP4 and propagating in the vehicle body 2. As a result, the voice processing device 100 can suppress, more effectively, a phenomenon that sounds other than a voice of the speaker who uttered the WuW are mixed and output and thereby make a voice uttered by the speaker clearer.

Modification 2 of Embodiment 1

How a voice control unit 140 according to a second modification of the first embodiment operates will be described with reference to FIG. 8. FIG. 8 is a processing block diagram showing how the voice control unit 140 according to the second modification operates. Portions having the same or equivalent portions in FIG. 3 will be given the same or equivalent symbols in the drawings etc. and descriptions therefor will be omitted or simplified.

As shown in FIG. 8, in the second embodiment, the voice control unit 140 further has a beam forming (BF) processing unit 146. Each of the plural different microphones MC1-MC6 is a micro-array that includes plural microphone elements.

The beam forming processing unit 146 forms voice signal directivity that is directed to a speaker corresponding to a sound source of a voice signal picked up by a speaker position microphone, using the plural microphones MC1-MC6 each being a micro-array. By forming this directivity, the beam forming processing unit 146 suppresses picking-up of voices and noise generated around the WuW speaker in the vehicle body 2 by directing the directivity axis to the direction of the WuW speaker.

As described above, the voice processing device 100 according to the second modification of the first embodiment further has the beam forming processing unit 146 for forming voice signal directivity that is directed to a speaker (e.g., a speaker who uttered the WuW) corresponding to a sound source of a voice signal picked up by a speaker position microphone. Each of the plural different microphones MC1-MC6 of the voice processing device 100 is a micro-array that includes plural microphone elements. With these measures, the beam forming processing unit 146 can suppress picking-up of voices and noise generated around the speaker in the vehicle body 2 using the plural microphones MC1-MC6 each being a micro-array and thereby make a voice uttered by the speaker even clearer.

Embodiment 2

Next, a voice processing device 200, a voice processing method, and a voice processing system 200S according to a second embodiment of the disclosure that can be installed in a vehicle 1 will be described with reference to FIGS. 9-12. FIG. 9 is a top view of the vehicle 1 employed in the second embodiment. FIG. 10 is a functional block diagram for description of the configuration of a system including the voice processing device 200. FIG. 11 is a processing block diagram for description of a signal processing operation of the voice control unit 240. FIG. 12 is a flowchart showing an operation procedure of a voice control unit 240. Portions having the same or equivalent portions in the first embodiment will be given the same or equivalent symbols in the drawings etc. and descriptions therefor will be omitted or simplified.

As shown in FIGS. 9 and 10, in the second embodiment, plural microphones MCs (more specifically, microphones MC1-MC6 and a WuW detection microphone MC7) are arranged in the vehicle body 2 and the seventh microphone (i.e., the microphone other than the microphones MC1-MC6 among the seven microphones) is the WuW detection microphone MC7. The WuW detection microphone MC7 as an example of a term "particular microphone" is a microphone dedicated to detection of a WuW and is buried in a ceiling surface at a position that is as close to approximately the center of the vehicle body 2. Although in FIG. 9 the WuW detection microphone MC7 is disposed at a middle position between the microphones MC3 and MC4, there are no limitations on the position where it is disposed. In the second embodiment, WuW detection is not performed based on voices picked up by the microphones MC1-MC6, that is, the microphones other than the seventh microphone (i.e., WuW detection microphone MC7).

Thus, as shown in FIG. 11, in the signal processing of the voice control unit 240, voice signals collected by the plural microphones MC1-MC6 are not input to the WuW detection unit 241 and only a voice signal collected by the seventh microphone (WuW detection microphone MC7), that is, only one-channel voice signal, is input to the WuW detection unit 241. On the other hand, as in the above-described first embodiment, voice signals of six channels of the plural microphones MC1-MC6 are input to the voice signal buffer unit 142, the speaker position detection unit 143 and the CTC unit 144.

The WuW detection unit 241 detects presence/absence of a voice signal of the WuW uttered by a particular speaker among the persons sitting in the vehicle 1 based on a voice signal collected by the WuW detection microphone MC7 according to a prescribed matching algorithm. The other part of the configuration is the same as in the above-described first embodiment.

More specifically, as shown in FIG. 12, the WuW detection unit 241 employed in the second embodiment directly acquires a voice signal collected by the WuW detection microphone MC7 (S30). The WuW detection unit 241 starts processing of detecting the received voice signal of the WuW detection microphone MC7 (S31). The WuW detection unit 241 judges whether a WuW voice signal is included in the received voice signal (S32). On the other hand, in parallel with the WuW detection unit 241's executing steps S30-S32, the voice signal buffer unit 142 acquires voice signals collected by the microphones MC1-MC6 as in the first embodiment (S33). The voice signal buffer unit 142 always stores received voice signals of a prescribed period of the microphones MC1-MC6 individually. Steps executed thereafter are the same as in the first embodiment.

As described above, in the voice processing device 200 according to the second embodiment, the WuW detection unit (an example of the "word detection unit") 241 detects presence/absence of a voice signal of the WuW (an example of the "prescribed word") based on a voice signal collected by the WuW detection microphone MC7 among the plural different microphones MCs (more specifically, microphones MC1-MC6 and WuW detection microphone MC7). As a result, since the voice processing device 200 is merely required to detect a WuW voice signal from the voice signal collected by the WuW detection microphone MC7, the amount of information to be processed by the WuW detection unit 241 of the voice control unit 240 can be reduced and hence a voice uttered by the WuW speaker can be made clear more quickly.

Although the various embodiments have been described above with reference to the drawings, it goes without saying that the disclosure is not limited to those examples. It is apparent that those skilled in the art could conceive various changes, modifications, replacements, additions, deletions, or equivalents within the confines of the claims, and they are naturally construed as being included in the technical scope of the disclosure. Constituent elements of the above-described various embodiments can be combined in a desired manner without departing from the spirit and scope of the invention.

The present application is based on Japanese Patent Application No. 2018-066232 filed on Mar. 29, 2018, the contents of which are incorporated herein by reference.

INDUSTRIAL APPLICABILITY

The present disclosure is useful when applied to voice processing devices, voice processing methods, and voice processing systems that can be installed in vehicles and can detect, quickly, an utterance direction of a prescribed word (e.g., wake-up word) uttered in the vehicle and extract a voice that a speaker of the prescribed word utters following the prescribed word exclusively of voices of persons other than the speaker.

DESCRIPTION OF SYMBOLS

1: Vehicle
2: Vehicle body
3: Instrument panel
20: Audio output device
21: Amplifier
30: Vehicular devices
31: Car audio device
32: Air-conditioner
33: Illumination device
34: Video display device
35: Navigation device
40: Voice recognition server
41: Communication interface
42: Computing unit
43: Memory
44: Storage
100S: Voice processing system
100: Voice processing device
110: Communication interface
120: Vehicular device control unit
130: Memory
140: Voice control unit
141: WuW detection unit
142: Voice signal buffer unit
143: Speaker position detection unit
144: CTC unit
145: Reproduction sound canceller
146: Beam forming processing unit
200S: Voice processing system
200: Voice processing device
240: Voice control unit
241: WuW detection unit
SP1, SP2, SP3, SP4: Vehicular speaker
MC1, MC2, MC3, MC4, MC5, MC6: Microphone
MC7: WuW detection microphone
CL: Cloud

The invention claimed is:

1. A voice processing device installed in a vehicle and in which plural different microphones are arranged so as to correspond to respective seats, the voice processing device comprising:
at least one memory that stores instructions and voice signals from the plural different microphones; and
a processor that, when executing the instructions stored in the at least one memory, performs a process, wherein the process includes:
storing, in the at least one memory, the voice signals collected by the plural different microphones, respectively, during a prescribed period before a present time, the voice signals being repeatedly stored as buffered voice signals;
detecting whether a prescribed word is uttered by a speaker in the vehicle based on the voice signals collected by the plural different microphones, respectively;
determining, in response to the prescribed word being uttered and as a speaker position microphone, a microphone closest to the speaker by referring to the buffered voice signals stored in the at least one memory; and
in response to the determining of the speaker position microphone:
setting coefficients of the plural different microphones other than the speaker position microphone to suppress the voice signals collected by the plural different microphones other than the speaker position microphone;
stopping the storing of the buffered voice signals and the detecting of whether the prescribed word is uttered;
setting coefficients of the speaker position microphone to suppress voices uttered by persons other than the speaker; and
outputting a voice uttered by the speaker while suppressing the voices uttered by the persons other than the speaker.

2. The voice processing device according to claim 1, wherein the process further includes:
suppressing reproduction sound signals collected by the plural different microphones by a reproduction sound of a music reproduction device installed in the vehicle.

3. The voice processing device according to claim 1, wherein the process further includes:
forming voice signal directivity that is directed to the speaker corresponding to a sound source of a voice signal collected by the speaker position microphone, wherein:
each of the plural different microphones is a micro-array having plural microphone elements.

4. The voice processing device according to claim 1, wherein utterance of the prescribed word by the speaker is detected, by the processor, based on a voice signal collected by a particular one of the plural different microphones.

5. The voice processing device according to claim 1, wherein the process further includes:
changing an operation mode of the voice processing device from a particular speaker voice output mode for outputting the voice uttered by the speaker while suppressing the voices uttered by the other persons to a prescribed word detection standby mode for detecting whether the prescribed word is uttered, when having detected satisfaction of a prescribed condition.

6. The voice processing device according to claim 5, wherein:
presence/absence an end word that is different from the prescribed word is detected, by the processor, based on a voice signal collected by the speaker position microphone; and
the operation mode of the voice processing device is changed to the prescribed word detection standby mode by judging that the prescribed condition has been satisfied when a voice of the end word that is different from the prescribed word has been detected.

7. The voice processing device according to claim 5, wherein the operation mode of the voice processing device is changed, by the processor, to the prescribed word detection standby mode by judging that the prescribed condition has been satisfied when a prescribed period has elapsed from acquisition of a recognition result of the voice uttered by the speaker.

8. A voice processing method employed in a voice processing device, the voice processing device configured to be installed in a vehicle in which plural different microphones are arranged so as to correspond to respective seats, the voice processing method comprising:
storing, in a memory, voice signals collected by the plural different microphones, respectively, during a prescribed period before a present time, the voice signals being repeatedly stored as buffered voice signals;
detecting whether a prescribed word is uttered by a speaker in the vehicle based on the voice signals collected by the plural different microphones, respectively;
determining, in response to the prescribed word being uttered and as a speaker position microphone, a microphone closest to the speaker by referring to the buffered voice signals stored in the memory; and
in response to the determining of the speaker position microphone:
setting coefficients of the plural different microphones other than the speaker position microphone to suppress the voice signals collected by the plural different microphones other than the speaker position microphone;
stopping the storing of the buffered voice signals and the detecting of whether the prescribed word is uttered;
setting coefficients of the speaker position microphone to suppress voices uttered by persons other than the speaker; and
outputting a voice uttered by the speaker while suppressing the voices uttered by the persons other than the speaker.

9. A voice processing system comprising a voice processing device installed in a vehicle in which plural different microphones are arranged so as to correspond to respective seats and a control device which controls a vehicular device installed in the vehicle, wherein:
the voice processing device
is configured to store, in a memory, voice signals collected by the plural different microphones, respectively, during a prescribed period before a present time, the voice signals being repeatedly stored as buffered voice signals;
is configured to detect whether a prescribed word is uttered by a speaker sitting in the vehicle based on the voice signals collected by the plural different microphones, respectively;
is configured to determine, in response to the prescribed word being uttered and as a speaker position microphone, a microphone closest to the speaker by referring to the buffered voice signals stored in the memory; and
in response to the determining of the speaker position microphone:
is configured to set coefficients of the plural different microphones other than the speaker position microphone to suppress the voice signals collected by the plural different microphones other than the speaker position microphone;
is configured to stop storing of the buffered voice signals and detecting of whether the prescribed word is uttered;
is configured to set coefficients of the speaker position microphone to suppress voices uttered by persons other than the speaker;
is configured to output a voice uttered by the speaker while suppressing the voices uttered by the persons other than the speaker; and
is configured to acquire a recognition result of the voice uttered by the speaker; and
the control device is configured to control operation of the vehicular device according to the recognition result of the voice uttered by the speaker.

* * * * *